(12) United States Patent
Huang et al.

(10) Patent No.: US 11,527,155 B2
(45) Date of Patent: Dec. 13, 2022

(54) TIME-SEGMENTED SIGNAL TIMING METHOD AND APPARATUS FOR TRAFFIC LIGHT, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Xuan Huang, Beijing (CN); Fan Yang, Beijing (CN); Qiqi Xu, Beijing (CN); Chengfa Wang, Beijing (CN); Yongyi Sun, Beijing (CN); Hui Yuan, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 226 days.

(21) Appl. No.: 17/003,587

(22) Filed: Aug. 26, 2020

(65) Prior Publication Data
US 2021/0134152 A1  May 6, 2021

(30) Foreign Application Priority Data
Oct. 30, 2019  (CN) .......................... 201911046713.0

(51) Int. Cl.
*G08G 1/083* (2006.01)
*G01C 21/34* (2006.01)
(Continued)

(52) U.S. Cl.
CPC ......... *G08G 1/083* (2013.01); *G01C 21/3492* (2013.01); *G08G 1/0129* (2013.01);
(Continued)

(58) Field of Classification Search
CPC .... G08G 1/083; G08G 1/0129; G08G 1/0145; G08G 1/08; G08G 1/095; G08G 1/0116;
(Continued)

(56) References Cited

U.S. PATENT DOCUMENTS

2014/0067256 A1* 3/2014 Aoki .................... G01C 21/30
701/518
2018/0158326 A1* 6/2018 Fowe ................... G08G 1/0112

FOREIGN PATENT DOCUMENTS

| CN | 101038700 A | 9/2007 |
| CN | 101086804 A | 12/2007 |

(Continued)

OTHER PUBLICATIONS

Gerlough et al. "Traffic Flow Theory", Transportation Research Board National Research Council Washington D.C, 1975. (Year: 1975).*

(Continued)

*Primary Examiner* — Hai Phan
*Assistant Examiner* — Anthony D Afrifa-Kyei
(74) *Attorney, Agent, or Firm* — Bridgeway IP Law Group, PLLC; Jihun Kim (57) ABSTRACT

A time-segmented signal timing method is related to the field of intelligent transportation. The specific implementation is: obtaining traffic volume data of a target intersection in each period of time of N consecutive days, N being an integer greater than 1; performing curve fitting on the traffic volume data to determine a traffic volume curve corresponding to the target intersection of each day; determining calculating respective target points in the traffic volume curve with second derivatives satisfying a preset condition; and performing time-segmented signal timing on a traffic light at the target intersection based on time points corresponding to the respective target points.

17 Claims, 8 Drawing Sheets

(51) Int. Cl.
  *G08G 1/01* (2006.01)
  *G08G 1/08* (2006.01)
  *G08G 1/095* (2006.01)

(52) U.S. Cl.
  CPC ............. *G08G 1/0145* (2013.01); *G08G 1/08* (2013.01); *G08G 1/095* (2013.01)

(58) Field of Classification Search
  CPC ...... G08G 1/01; G08G 1/0104; G08G 1/0108; G08G 1/07; G08G 1/0133; G08G 1/04; G08G 1/0175; G08G 1/081; G01C 21/3492; G06Q 10/047; G06T 11/203; F02B 2075/027
  See application file for complete search history.

(56) References Cited

FOREIGN PATENT DOCUMENTS

| | | | |
|---|---|---|---|
| CN | 102288193 A | 12/2011 | |
| CN | 103956043 A | 7/2014 | |
| CN | 104504897 A | * 4/2015 | .......... G06K 9/6219 |
| CN | 104915726 A | 9/2015 | |
| CN | 105513379 A | 4/2016 | |
| CN | 105761517 A | 7/2016 | |
| CN | 107833463 A | 3/2018 | |
| CN | 108615375 A | 10/2018 | |
| CN | 108629989 A | 10/2018 | |
| CN | 109697849 A | 4/2019 | |
| CN | 109712393 A | 5/2019 | |
| CN | 109800801 A | 5/2019 | |
| CN | 109871412 A | 6/2019 | |
| JP | 2017129986 A | 7/2017 | |
| JP | 2018194954 A | 12/2018 | |
| WO | 2019156821 A1 | 8/2019 | |

OTHER PUBLICATIONS

Yoshinobu Sato, "Notice of Reasons for Refusal for JP Application No. 2020-182171", dated Aug. 31, 2021, JPO, Japan.

* cited by examiner

TIME-SEGMENTED SIGNAL TIMING METHOD AND APPARATUS FOR TRAFFIC LIGHT, ELECTRONIC DEVICE AND STORAGE MEDIUM

CROSS-REFERENCE TO RELATED APPLICATION

This application claims priority to and benefits of Chinese Patent Application Serial No. 201911046713.0, filed the State Intellectual Property Office of P. R. China on Oct. 30, 2019, the entire content of which is incorporated herein by reference.

FIELD

The present disclosure relates to fields of data processing and intelligent transportation technologies, and more particularly, relates to a time-segmented signal timing method and an apparatus for a traffic light, an electronic device and a storage medium.

BACKGROUND

At present, in the field of intelligent transportation, in order to improve the accuracy of controlling a traffic light, traffic volume at each intersection is usually first calculated, and then time is divided manually according to the traffic volume obtained. Time-segmented control is performed on the traffic light based on the divided periods of time.

SUMMARY

Embodiments of the present disclosure provide a time-segmented signal timing method for a traffic light, including: obtaining traffic volume data of a target intersection in each period of time of N consecutive days, in which N is an integer greater than 1; performing curve fitting on the traffic volume data to determine a traffic volume curve corresponding to the target intersection of each day; determining target points in the traffic volume curve with second derivatives satisfying a preset condition; and performing time-segmented signal timing on a traffic light at the target intersection based on time points corresponding to the target points.

Embodiments of the present disclosure provide an electronic device, including at least one processor and a memory device communicatively connected to the at least one processor. The storage device stores an instruction executable by the at least one processor. The instruction is executed by the at least one processor to enable the at least one processor to perform the time-segmented signal timing method for a traffic light according to embodiments of the first aspect as described above.

Embodiments of the present disclosure provide a non-transitory computer-readable storage medium having a computer instruction stored thereon. The computer instruction is configured to enable a computer to perform the time-segmented signal timing method for a traffic light according to embodiments of the first aspect as described above.

Other effects of the above optional implementations will be described below in combination with specific embodiments.

BRIEF DESCRIPTION OF THE DRAWINGS

The accompanying drawings are used for a better understanding of the solution of the present disclosure, and do not constitute a limitation of the present disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

A time-segmented signal timing method and an apparatus for a traffic light, an electronic device and a storage medium will be described below with reference to the accompanying drawings.

As mentioned above in the Background, the prior art has technical problems that, when time periods are divided manually based on the traffic volume obtained, division results are not accurate enough due to influence of subjective feelings of human, which makes accuracy of the time-segmented control of the traffic light poor. With respect to the above technical problems, the present disclosure provides a time-segmented signal timing method for a traffic light. With the method, curve fitting is used to simulate a traffic volume curve at an intersection, respective target points are determined based on the traffic volume curve, and the time-segmented signal timing for the traffic light is performed based on respective time points corresponding to the respective target points, without manual participation, thereby improving the accuracy of the division results as the interference of the subjective feelings of human on the division results is avoided, and improving the accuracy and reliability of the time-segmented control of the traffic light.

Figure 1:
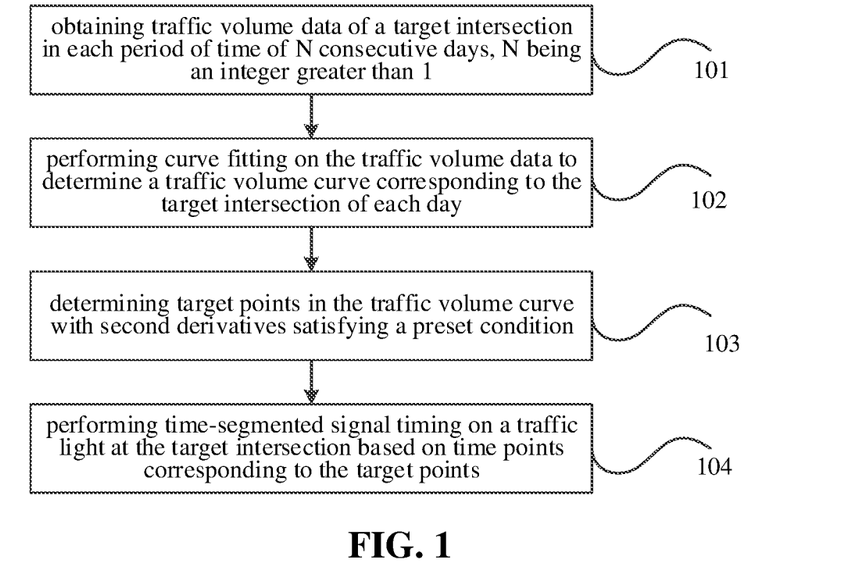
FIG. 1 is a flowchart of a time-segmented signal timing method for a traffic light according to a first embodiment of the present disclosure.

In detail, FIG. 1 is a schematic flowchart of a time-segmented signal timing method for a traffic light according to a first embodiment of the present disclosure. The method may be performed by a time-segmented signal timing apparatus for a traffic light provided by the present disclosure, or may be performed by an electronic device. The electronic device may be a server, or may be a terminal device such as a vehicle-mounted terminal or a mobile terminal, which is not limited in the present disclosure. Hereinafter, the present disclosure is explained in an example where the server performs the time-segmented signal timing method for a traffic light.

As illustrated in FIG. 1, the time-segmented signal timing method for a traffic light includes the following.

At block 101, traffic volume data of a target intersection in each period of time of N consecutive days is obtained. N is an integer greater than 1.

N may be preset, for example, to 10, 30, etc. Each period of time may also be set in advance. For example, every 5 minutes is divided as one period of time, or every 15 minutes is divided as one period of time, and so on.

In this embodiment, the traffic volume data of the target intersection in each period of time in N consecutive days may be obtained. The traffic volume data may accurately reflect traffic change rules of the target intersection within a day. For example, the traffic volume data may be a number of vehicles passing through the target intersection in each period of time.

For example, when obtaining the traffic volume data of the target intersection, a surveillance video of the target intersection may be obtained from a surveillance camera of the target intersection. By performing vehicle recognition on the surveillance video, the number of vehicles recognized in each period may be counted, thereby the traffic volume data of the target intersection in each period of time is determined.

It may be understood that the obtained traffic volume data of the target intersection in each period of time may be traffic data in each period of time in each driving direction to which the target intersection leads. Alternatively, the obtained traffic volume data of the target intersection in each period of time may be total traffic volume in respective driving directions of the target intersection in each period of time, that is, the traffic volume data in each period of time is a sum of numbers of vehicles passing through respective driving directions of the target intersection during the period of time.

At block 102, curve fitting is performed on the traffic volume data to determine a traffic volume curve corresponding to the target intersection of each day.

In this embodiment, after obtaining the traffic volume data of the target intersection in each period of time for the N consecutive days, the curve fitting may be performed on the obtained traffic volume data to generate the traffic volume curve corresponding to the target intersection. The traffic volume curve is a function of time and traffic volume. Normally, the daily traffic change rule of one intersection changes very little, so the traffic volume curve obtained by the fitting may represent the daily traffic situation of the target intersection.

As a possible implementation, the traffic volume data obtained may be directly used for the curve fitting. An appropriate type of curve may be selected to fit the traffic volume data obtained, and then required parameters may be determined by solving equations or optimization methods. And finally, a curve serving as the traffic volume curve corresponding to the target intersection may be obtained.

As a possible implementation, the curve fitting may also be performed for each period of time, and then the traffic volume curve of one day corresponding to the target intersection may be obtained by splicing. In detail, performing the curve fitting on the traffic volume data to determine the traffic volume curve corresponding to the target intersection of each day includes: dividing the traffic volume data in each period of time of the N consecutive days into M datasets based on a preset rule, in which data in each dataset corresponds to the same period of time, and M is an integer greater than 1; performing curve fitting on the data in each dataset to determine a curve corresponding to each dataset; and splicing M curves based on the period of time corresponding to the data in each dataset to generate the traffic volume curve corresponding to the target intersection every day.

The preset rule is pre-set, which may be manually specified in advance, or may be automatically generated based on curves historically fitted. For example, the preset rule may be: dividing traffic volume data of 5 adjacent periods of time starting from the first period of time into one dataset, and dividing traffic volume data in the same period of time in each day into one dataset. That is, one dataset includes traffic volume data of the same 5 adjacent periods of time in N days. Each dataset obtained by dividing the traffic volume data based on the preset rule corresponds to a continuous period of time.

After dividing the traffic volume data in each period of time to obtain the M datasets, the curve fitting may be performed on the data in each dataset to determine a curve corresponding to each dataset, and the M curves are obtained, and then the M curves may be spliced to generate the traffic volume curve corresponding to the target intersection based on the period of time corresponding to the data in each dataset.

During the splicing, curves with a same end point may be spliced together based on end points of the period of time corresponding to the data in each dataset to obtain the traffic volume curve corresponding to the target intersection.

By dividing the traffic volume data obtained into a plurality of datasets, performing the curve fitting on the data in each dataset, and obtaining the traffic volume curve by splicing the curves, the amount of data and difficulty of the curve fitting are reduced since the amount of data in the dataset is much less than the amount of the traffic volume data obtained. In addition, the curve obtained by fitting is more accurate, which is beneficial to improving the accuracy of the traffic volume curve.

It should be noted that, in embodiments of the present disclosure, data for the curve fitting may also be selected based on usages of the traffic volume curve obtained by fitting. For example, if the traffic volume curve is only used for the time-segmented control of the traffic light, the curve fitting may be performed on the traffic volume data in each driving direction of the target intersection to obtain a traffic volume curve corresponding to each driving direction, or the curve fitting may be performed on the total traffic volume data in respective driving directions of the target intersection to obtain a traffic volume curve corresponding to the target intersection. If the traffic volume curve is not only used for the time-segmented control of the traffic light, but also for route planning, traffic warning, etc., a traffic volume curve corresponding to each driving direction of the target intersection may be determined, and the curve fitting may be performed on the traffic volume data in each driving direction to obtain the traffic volume curve corresponding to each driving direction.

At block 103, target points in the traffic volume curve with second derivatives satisfying a preset condition are determined.

The preset condition may be preset. For example, the preset condition may be that a second derivative of the traffic volume curve is equal to zero.

It may be understood that a point where a second derivative of a primitive function is equal to 0 is referred to as an inflection point of the primitive function, and the inflection point may reflect the change direction of the curve of the function. Therefore, in this embodiment, the points with second derivatives of the traffic volume curve being 0 may be determined as the target points. The target points may reflect the change direction of the traffic volume curve. The change direction includes going upwards or going downwards, that is, from a time point corresponding to one of the target points, the traffic volume begins to increase or decrease.

In detail, after the traffic volume curve corresponding to the target intersection is determined, a second derivative operation may be performed on the traffic volume curve, and points with second derivatives being equal to zero are calculated by making the second derivative of the traffic volume curve equal to zero. The points with second derivatives being equal to zero are the target points determined, and each of the target points is a time point.

At block 104, time-segmented signal timing is performed on a traffic light at the target intersection based on time points corresponding to the target points.

In this embodiment, after the respective target points are determined, the time-segmented signal timing may be performed on the traffic light at the target intersection based on the time point corresponding to the respective target points.

For example, the target points determined are 7:30, 9:30, 11:30, 14:00, 17:00 and 19:30, one day (0:00~24:00) may be divided into 7 periods of time: 0:00~7:30, 7:30~9:30, 9:30~11:30, 11:30~14:00, 14:00~17:00, 17:00~19:30 and 19:30~24:00. And then, different signal timing solutions are allocated for the traffic light in each period of time. For example, for the period of time of 7:30~9:30, the traffic volume data of the target intersection is of a large amount, thus, a long transit time is configured for the traffic light, that is, a long duration is allocated for the green light to ease the traffic pressure at the target intersection and to avoid traffic jams at the target intersection during this period of time. For the period of time of 9:30~11:30, the rush hour has passed and the traffic volume is light, thus a short transit time is configured for the traffic light in this period of time.

With the time-segmented signal timing method for a traffic light according to embodiments of the present disclosure, the traffic volume data of the target intersection in each period of time of N consecutive days is obtained, in which N is an integer greater than 1. The curve fitting is performed on the traffic volume data to determine the traffic volume curve corresponding to the target intersection of each day. The target points in the traffic volume curve with the second derivatives satisfying the preset condition are determined. The time-segmented signal timing is performed on the traffic light at the target intersection based on the time points corresponding to the target points. Therefore, by simulating the traffic volume at the target intersection through the curve fitting to perform the time-segmented control on the traffic light, labor costs are reduced as human participation is unnecessary. Since human participation is unnecessary, the interference of subjective feelings of human on division results is avoided, which may improve the accuracy of the division results, improve the accuracy and reliability of the time-segmented control of the traffic light, and make intelligent transportation possible.

Figure 2:
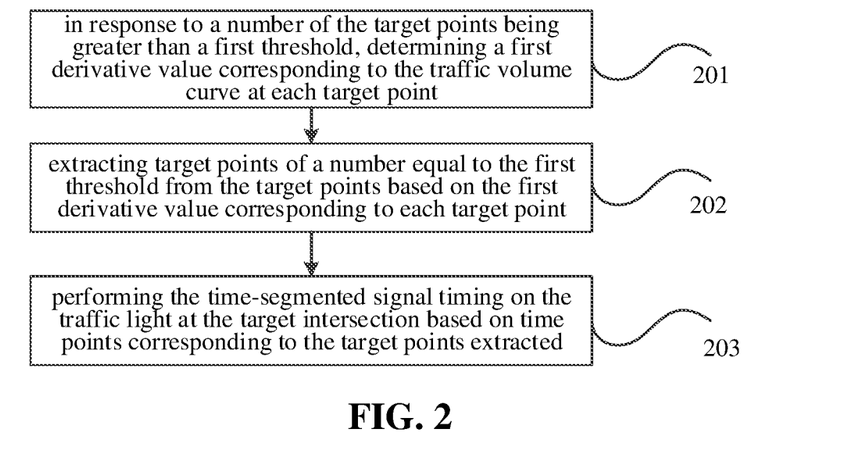
FIG. 2 is a flowchart of a time-segmented signal timing method a traffic light according to a second embodiment of the present disclosure.

Normally, peak periods of traffic volume within one day are certain, such as the morning rush hour and evening rush hour. Therefore, the number of divided periods of time may be set in advance, and then the target points determined may be filtered based on the number of divided periods of time. Consequently, in a possible implementation of embodiments of the present disclosure, as illustrated in FIG. 2, and on the basis of embodiments illustrated in FIG. 1, the action at block 104 may include the following.

At block 201, in response to a number of the target points being greater than a first threshold, a first derivative value corresponding to the traffic volume curve at each target point is determined.

The first threshold may be set in advance. For example, the first threshold may be set to 4, 6, etc.

In this embodiment, after the target points are determined, the number of the target points may be compared with the first threshold. If the number is not greater than the first threshold, the time-segmented signal timing is performed on the traffic light at the target intersection based on the target points determined. If the number is greater than the first threshold, the first derivative value corresponding to the traffic volume curve at each target point is determined.

In detail, during the comparison or when it is determined that the number of the target points is greater than the first threshold, the traffic volume curve is derived to obtain the first derivative corresponding to the traffic volume curve. Each target point is substituted into the first derivative to calculate the first derivative value corresponding to each target point.

At block 202, target points of a number equal to the first threshold are extracted from the target points based on the first derivative value corresponding to each target point.

In this embodiment, after calculating the first derivative value corresponding to the target point, the target point may be filtered based on each first derivative value, and the target points of the number equal to the first threshold are extracted from the plurality of target points.

As an example, an absolute value of each first derivative value may be calculated, and the absolute values may be sorted in a descending order. The target points corresponding to the first P absolute values may be determined as the final selected target points, where P is the first threshold.

For example, the first threshold is 4, and the target points obtained after calculation are 7, the first derivative values of the traffic volume curve at these 7 target points may be calculated, and then four target points whose absolute values of the first derivative values rank top 4 of the 7 absolute values are determined as the final selected target points.

At block 203, the time-segmented signal timing is performed on the traffic light at the target intersection based on time points corresponding to the target points extracted.

For example, 6 target points are determined, which are 7:30, 9:30, 11:30, 14:00, 17:00 and 19:30, and the first threshold is 4. After the derivation of the traffic volume curve, if the absolute values of the first derivative values of the target points 7:30, 9:30, 17:00 and 19:30 are the largest in the absolute values of the first derivative values corresponding to the target points obtained through calculation, it may be determined that the final selected target points are 7:30, 9:30, 17:00 and 19:30. Consequently, one day (0:00~24:00) may be divided into 5 periods of time: 0:00~7:

30, 7:30~9:30, 9:30~17:00, 17:00~19:30 and 19:30~24:00. Furthermore, for each period of time, different signal timing solutions are allocated for the traffic light. For example, in the period of time of 7:30~9:30, the traffic volume data at the target intersection is of a large amount, thus, a long transit time may be configured for the traffic light, that is, a long duration is allocated for the green light to alleviate the traffic pressure at the target intersection and to prevent target jams from happening at the target intersection during this period of time. For the period of time of 9:30~17:00, the traffic light is configured with a short transit time.

With the time-segmented signal timing method for a traffic light according to the embodiment, in response to the number of the target points being greater than the first threshold, the first derivative value corresponding to the traffic volume curve at each target point is determined. The target points of the number equal to the first threshold are extracted from the target points based on the first derivative value corresponding to each target point. The time-segmented signal timing is performed on the traffic light at the target intersection based on the time points corresponding to the target points extracted. Consequently, by screening the target points and performing the time-segmented signal timing on the traffic light based on respective time points corresponding to the target points extracted, the accuracy of the time-segmented control of the traffic light may be further improved.

Figure 3:
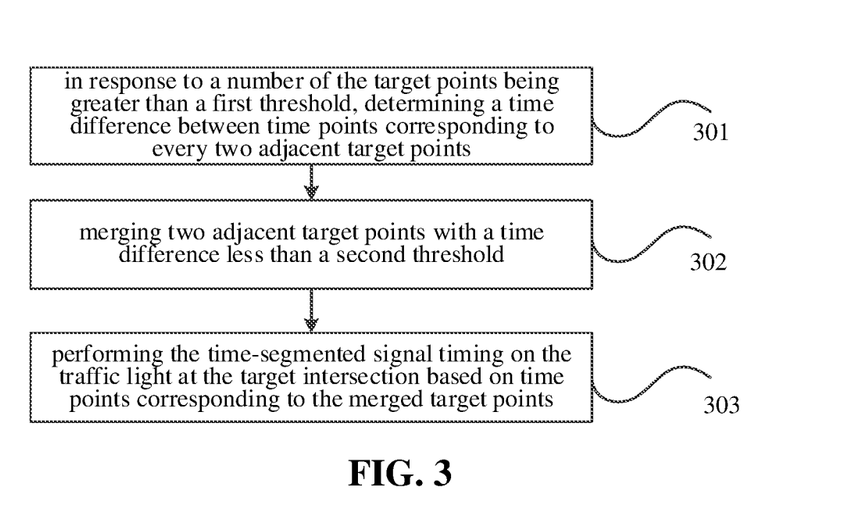
FIG. 3 is a flowchart of a time-segmented signal timing method a traffic light according to a third embodiment of the present disclosure.

Since the target points in the present disclosure are determined in response to the second derivative of the traffic volume curve satisfying the preset condition, for the target points calculated, there may be a case where the time points corresponding to the target points are relatively close to each other. In this case, target points at adjacent time points may be merged to reduce the number of divided periods of time, and to improve the accuracy of the periods of time divided. Therefore, in a possible implementation of embodiments of the present disclosure, as illustrated in FIG. 3, and on the basis of the embodiment illustrated in FIG. 1, the action at block 104 may include the following.

At block 301, in response to a number of the target points being greater than a first threshold, a time difference between time points corresponding to every two adjacent target points is determined.

The first threshold may be set in advance. For example, the first threshold may be set to 4, 6, etc.

In this embodiment, after the target points are determined, the number of the target points may be compared with the first threshold. If the number of the target points is not greater than the first threshold, the time-segmented signal timing may be performed on the traffic light at the target intersection based on the target points determined. If the number of the target points is greater than the first threshold, the time difference between the time points corresponding to every two adjacent target points is determined.

At block 302, two adjacent target points with a time difference less than a second threshold are merged.

The second threshold may be preset. For example, the second threshold may be set to 5 minutes, 10 minutes, and so on.

In this embodiment, after determining the time difference between the time points corresponding to every two adjacent target points, the time difference determined may be compared with the second threshold, and two adjacent target points with a time difference less than the second threshold may be merged.

When merging the two target points, one of the two target points may be arbitrarily selected for time segmentation, or an average value of the two target points may be calculated for the time segmentation. In the present disclosure, there is no limitation on the manner of merging.

For example, the second threshold is 20 minutes, and the two adjacent target points are 9:00 and 9:10. Since the time difference between 9:00 and 9:10 is 10 minutes, which is less than the second threshold, 9:00 and 9:10 may be merged. For example, an average value, 9:05, of 9:00 and 9:10 may be determined as the final target point.

It should be noted that if the time difference between the time points of any two adjacent target points is greater than the second threshold, the time-segmented signal timing may be performed on the traffic light based on the time points corresponding to the respective target points. Alternatively, the target points may be filtered based on the traffic volume data of a period of time to which each target point belongs, Q target points with traffic volume data amount larger than other target points may be selected for the time-segmented signal timing of the traffic light, Q is the first threshold. The specific processing method may be selected based on actual situations, which is not limited in the present disclosure.

At block 303, the time-segmented signal timing is performed on the traffic light at the target intersection based on time points corresponding to the merged target points.

In this embodiment, after merging target points that satisfy the condition, the time-segmented signal timing may be performed on the traffic light at the target intersection based on the time points corresponding to the merged target points.

For example, the first threshold is 4, the second threshold is 20 minutes, and the target points determined are 7:30, 9:30, 9:40, 17:00, 17:10, and 19:30. By merging the target points, the final target points determined are 7:30, 9:40, 17:00, and 19:30, and then one day may be divided into a plurality of periods of time, 0:00~7:30, 7:30~9:40, 9:40~17:00, 17:00~19:30 and 19:30~24:00 based on the final target points determined, 7:30, 9:40, 17:00, and 19:30. In this example, the process of merging is performed on the target points by selecting one of the two adjacent time points, and a time span of the peak traffic volume is required to be extended when selecting the target point. For example, 9:40 instead of 9:30 is selected as a final target point, so that a time period of the morning rush hour is 7:30~9:40, which is longer than 7:30~9:30, and requirements of signal timing for the traffic light during the rush hour may be satisfied.

With the time-segmented signal timing method for a traffic light according to the embodiment, in response to the number of the target points being greater than the first threshold, the time difference between the time points corresponding to every two adjacent target points is determined. The two target points with a time difference less than the second threshold are merged. The time-segmented signal timing is performed on the traffic light at the target intersection based on the time points corresponding to the merged target points. Consequently, by merging the target points close to each other, the number of divided periods of time may be reduced, and the accuracy of the time-segmented control of the traffic light may be improved.

Figure 4:
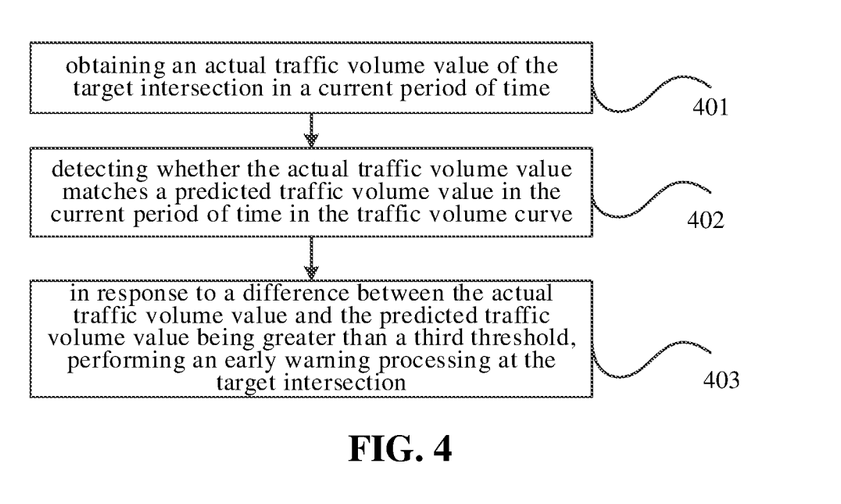
FIG. 4 is a flowchart of a time-segmented signal timing method for a traffic light according to a fourth embodiment of the present disclosure.

When an abnormal situation occurs in an upstream section of a road where the intersection is located, such as a vehicle failure, a traffic accident, a road-related problem, etc., the traffic volume passing through the intersection will be affected. Therefore, in a possible implementation of embodiments of the present disclosure, an abnormality warning may also be carried out based on an actual traffic volume passing through the target intersection. In detail, as illustrated in FIG. 4, and on the basis of the embodiment illustrated in FIG. 1, the method may further include the followings after the action at block 102.

At block 401, an actual traffic volume value of the target intersection in a current period of time is obtained.

In this embodiment, the actual traffic volume value of the target intersection at the current period of time may be obtained by acquiring a surveillance video collected by a surveillance camera at the target intersection and performing vehicle recognition on the surveillance video.

For example, the surveillance video of the target intersection may be obtained in real time, and the actual traffic volume value at each time point in the current period of time may be obtained through the vehicle recognition.

At block 402, it is detected whether the actual traffic volume value matches a predicted traffic volume value in the current period of time in the traffic volume curve.

At block 403, in response to a difference between the actual traffic volume value and the predicted traffic volume value being greater than a third threshold, an early warning processing is performed at the target intersection.

The third threshold may be preset.

In this embodiment, according to the traffic volume curve, the predicted traffic volume value at each time point in the current period of time may be obtained, and then the actual traffic volume value at each time point is compared with the predicted traffic volume value to determine whether the actual traffic volume value matches the predicted traffic volume value. If the actual traffic volume value is less than the predicted traffic volume value, and the difference between the actual traffic volume value and the predicted traffic volume value is greater than the third threshold, it may be determined that there may be an abnormal situation on the road in an opposite direction to the driving direction of the target intersection, that is, there is an abnormal situation in the upstream of the driving direction that prevents vehicles from passing the intersection. In this case, an early warning on the target intersection may be carried out.

The abnormal situation may be, for example, a road-related problem, a traffic accident, a vehicle failure, and so on.

As an example, when the early warning is carried out on the target intersection, an early warning prompt may be sent to traffic control personnel. For example, a location of the target intersection may be sent to the traffic control personnel, to remind the traffic control personnel to go to the upstream of the driving direction of the target intersection to direct the traffic.

As an example, when the early warning is carried out on the target intersection, an early warning prompt may be sent to vehicles within a preset range, such as sending a reminder message "there may be a breakdown near the XX intersection, please choose another road" to remind the vehicles to avoid the abnormal section.

With the time-segmented signal timing method for a traffic light according to the embodiment, the actual traffic volume value of the target intersection in the current period of time is obtained. It is detected whether the actual traffic volume value matches the predicted traffic volume value in the current period of time in the traffic volume curve. In response to the difference between the actual traffic volume value and the predicted traffic volume value being greater than the third threshold, the early warning processing is performed at the target intersection. Therefore, by performing the early warning processing based on a comparison of the actual traffic volume value and the predicted traffic volume value, the early warning on a possible abnormal condition at the target intersection may be sent out, so that the traffic control personnel and passing vehicles may be aware of the road condition timely.

Figure 5:
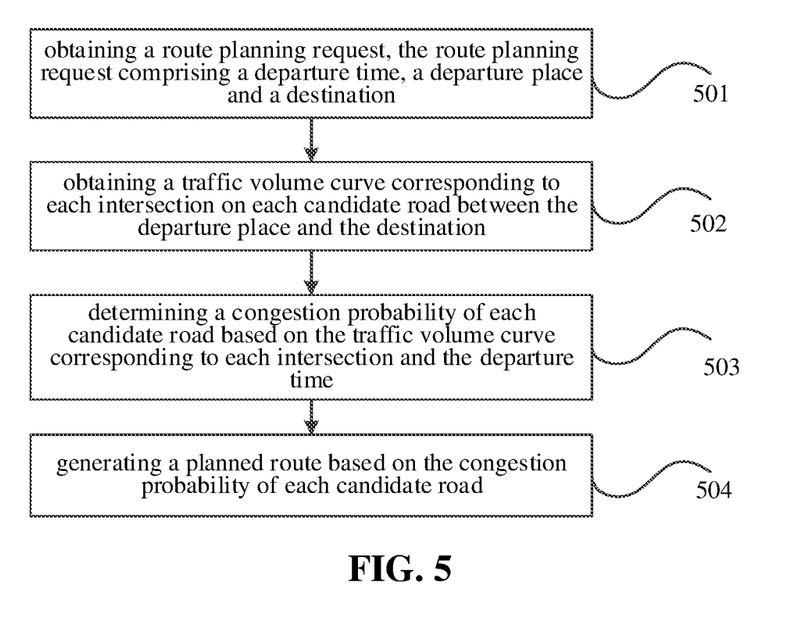
FIG. 5 is a flowchart of a time-segmented signal timing method for a traffic light according to a fifth embodiment of the present disclosure.

In a possible implementation of embodiments of the present disclosure, a recommendation on a navigation path may also be made based on the determined traffic volume curve. In detail, as illustrated in FIG. 5, and on the basis of the foregoing embodiments, the method may further include the following after the action at block 102.

At block 501, a route planning request is obtained. The route planning request includes a departure time, a departure place and a destination.

The route planning request may be issued by a vehicle-mounted navigation device or a navigation program installed in a mobile terminal. When a user uses the vehicle-mounted navigation device or the navigation program for route navigation, the vehicle-mounted navigation device or the navigation program sends the route planning request, and a server may obtain the route planning request. The departure time included in the route planning request may be determined based on the system time when the user uses a function of navigation, and the departure place and destination may be determined based on a departure place and a destination entered for navigation by the user.

At block 502, a traffic volume curve corresponding to each intersection on each candidate road between the departure place and the destination is obtained.

In this embodiment, after the route planning request is obtained, each candidate road from the departure place to the destination may be determined based on the departure place and destination in the route planning request, and then, each intersection of each candidate road may be determined to obtain the traffic volume curve corresponding to each intersection.

At block 503, a congestion probability of each candidate road is determined based on the traffic volume curve corresponding to each intersection and the departure time.

In detail, after the traffic volume curve of each intersection is obtained, the traffic volume of each intersection at the departure time and the traffic volume after the departure time may be determined based on the departure time and the traffic volume curve corresponding to each intersection. The road situation of the intersection may be determined based on the traffic volume at the departure time and the traffic volume after the departure time, and then the congestion probability of each candidate road may be determined.

It may be understood that the greater the traffic volume at an intersection, the greater the number of intersections with great traffic volume on the road, and the greater the probability of road congestion.

At block 504, a planned route is generated based on the congestion probability of each candidate road.

In this embodiment, after the congestion probability of each candidate road is determined, the planned route may be generated based on the congestion probability of each candidate road to provide the user with a fast navigation path having the lowest congestion risk.

With the time-segmented signal timing method for a traffic light according to the embodiment, the route planning request is obtained. The route planning request includes the departure time, the departure place and the destination. The traffic volume curve corresponding to each intersection on each candidate road between the departure place and the destination is obtained. The congestion probability of each candidate road is determined based on the traffic volume curve corresponding to each intersection and the departure time. The planned route is generated based on the congestion probability of each candidate road. Consequently, by obtaining the congestion probability of each candidate road and generating the planned route based on the congestion probability, it is helpful to recommend a route with little traffic to the user and to improve the user experience.

According to embodiments of the present disclosure, the present disclosure further provides an apparatus for time-segmented time allocation for a traffic light.

Figure 6:
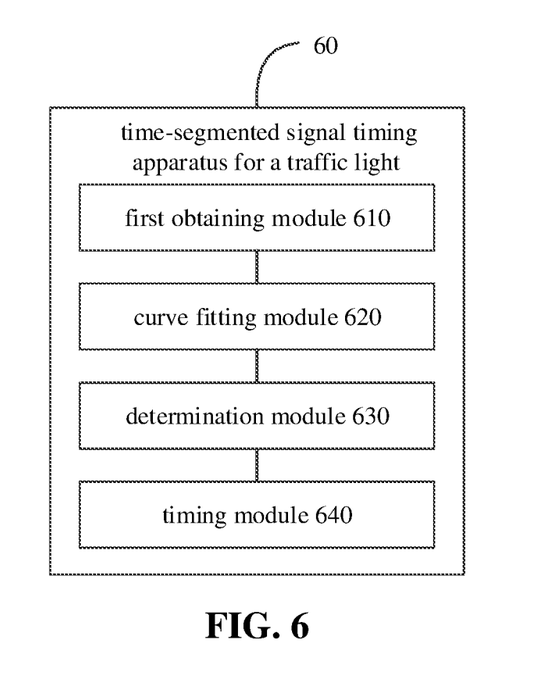
FIG. 6 is a block diagram of a time-segmented signal timing apparatus for a traffic light according to a sixth embodiment of the present disclosure.

FIG. 6 is a schematic diagram of a time-segmented signal timing apparatus for a traffic light according to a sixth embodiment of the present disclosure. As illustrated in FIG. 6, a time-segmented signal timing apparatus 60 for a traffic light includes a first obtaining module 610, a curve fitting module 620, a determination module 630, and a timing module 640.

The first obtaining module 610 is configured to obtain traffic volume data of a target intersection in each period of time of N consecutive days. N is an integer greater than 1.

The curve fitting module 620 is configured to perform curve fitting on the traffic volume data to determine a traffic volume curve corresponding to the target intersection of each day.

In a possible implementation of embodiments of the present disclosure, the curve fitting module 620 is configured to: divide the traffic volume data in each period of time of the N consecutive days into M datasets based on a preset rule, in which data in each dataset corresponds to the same period of time, and M is an integer greater than 1; perform curve fitting on the data in each dataset to determine a curve corresponding to each dataset; and splice M curves based on the period of time corresponding to the data in each dataset to generate the traffic volume curve corresponding to the target intersection of each day.

The determination module 630 is configured to determinate target points in the traffic volume curve with second derivatives satisfying a preset condition.

The timing module 640 is configured to perform time-segmented signal timing on a traffic light at the target intersection based on time points corresponding to the target points.

Figure 7:
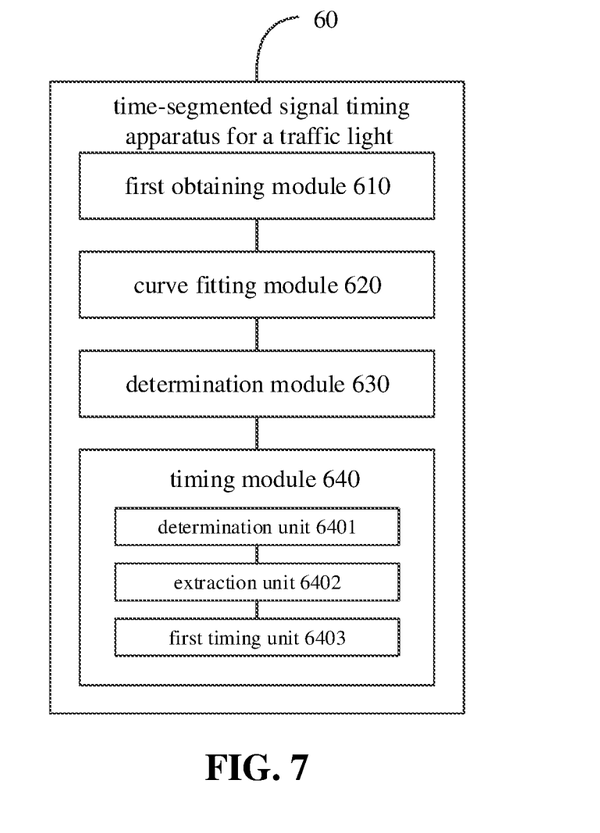
FIG. 7 is a block diagram of a time-segmented signal timing apparatus for a traffic light according to a seventh embodiment of the present disclosure.

In a possible implementation of embodiments of the present disclosure, as illustrated in FIG. 7, and on the basis of the embodiment illustrated in FIG. 6, the timing module 640 includes a determination unit 6401, an extraction unit 6402, and a first timing unit 6403.

The determination unit 6401 is configured to, in response to a number of the target points being greater than a first threshold, determine a first derivative value corresponding to the traffic volume curve at each target point.

The extraction unit 6402 is configured to extract target points of a number equal to the first threshold from the target points based on the first derivative value corresponding to each target point.

The first timing unit 6403 is configured to perform the time-segmented signal timing on the traffic light at the target intersection based on time points corresponding to the target points extracted.

By screening the target points and performing the time-segmented signal timing on the traffic light based on respective time points corresponding to the target points extracted, the accuracy of the time-segmented control of the traffic light may be further improved.

Figure 8:
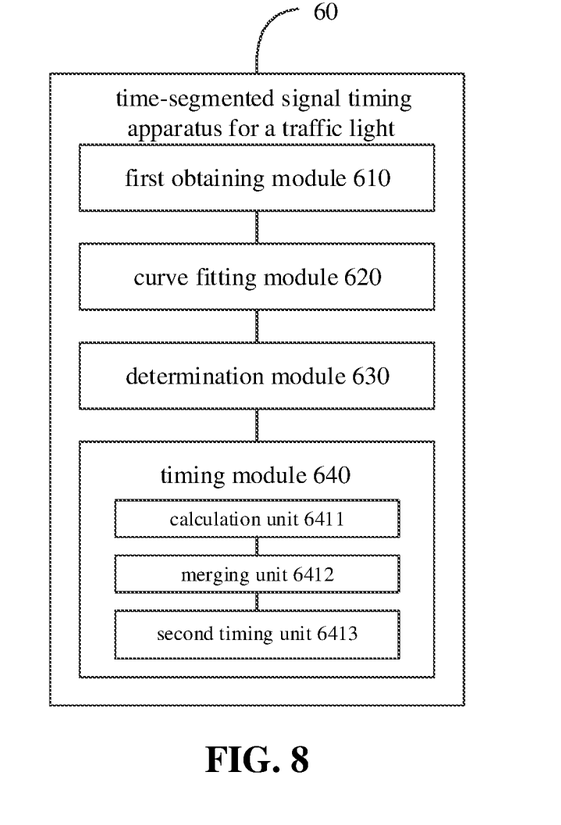
FIG. 8 is a block diagram of a time-segmented signal timing apparatus for a traffic light according to an eighth embodiment of the present disclosure.

In a possible implementation of embodiments of the present disclosure, as illustrated in FIG. 8, and on the basis of the embodiment illustrated in FIG. 6, the timing module 640 includes a calculation unit 6411, a merging unit 6412, and a second timing unit 6413.

The calculation unit 6411 is configured to, in response to a number of the target points being greater than a first threshold, determine a time difference between time points corresponding to every two adjacent target points.

The merge unit 6412 is configured to merge two adjacent target points with a time difference less than a second threshold.

The second timing unit 6413 is configured to perform the time-segmented signal timing on the traffic light at the target intersection based on time points corresponding to the merged target points.

By merging the target points close to each other, the number of divided periods of time may be reduced, and the accuracy of the time-segmented control of the traffic light may be improved.

Figure 9:
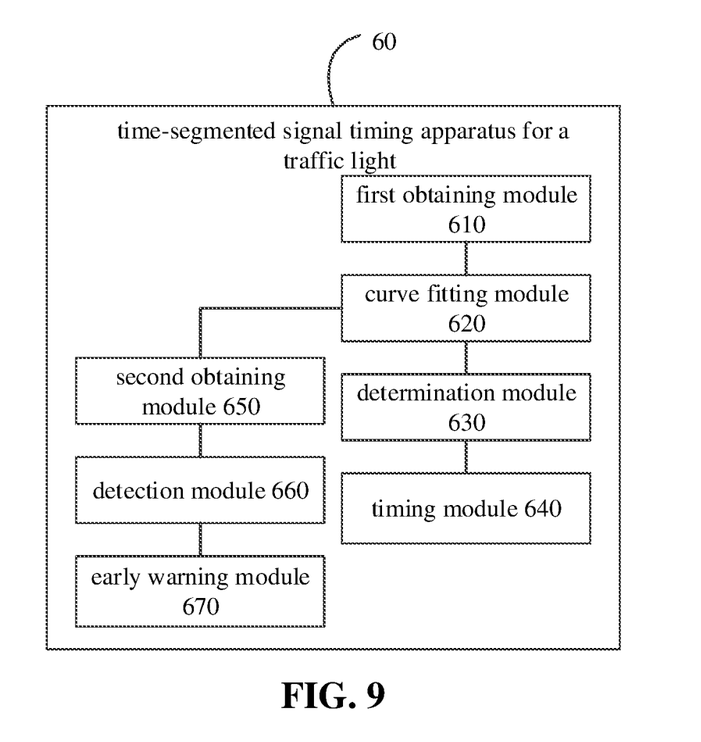
FIG. 9 is a block diagram of a time-segmented signal timing apparatus for a traffic light according to a ninth embodiment of the present disclosure.

In a possible implementation of embodiments of the present disclosure, as illustrated in FIG. 9, and on the basis of the embodiment illustrated in FIG. 6, the time-segmented signal timing apparatus 60 for a traffic light further includes a second obtaining module 650, a detection module 660, and an early warning module 670.

The second obtaining module 650 is configured to obtain an actual traffic volume value of the target intersection in a current period of time.

The detection module 660 is configured to detect whether the actual traffic volume value matches a predicted traffic volume value in the current period of time in the traffic volume curve.

The early warning module 670 is configured to, in response to a difference between the actual traffic volume value and the predicted traffic volume value being greater than a third threshold, perform an early warning processing at the target intersection.

By performing the early warning processing based on a comparison of the actual traffic volume value and the predicted traffic volume value, early warnings on possible abnormal conditions at the target intersection may be sent out, so that traffic control personnel and passing vehicles may be aware of the road conditions timely.

Figure 10:
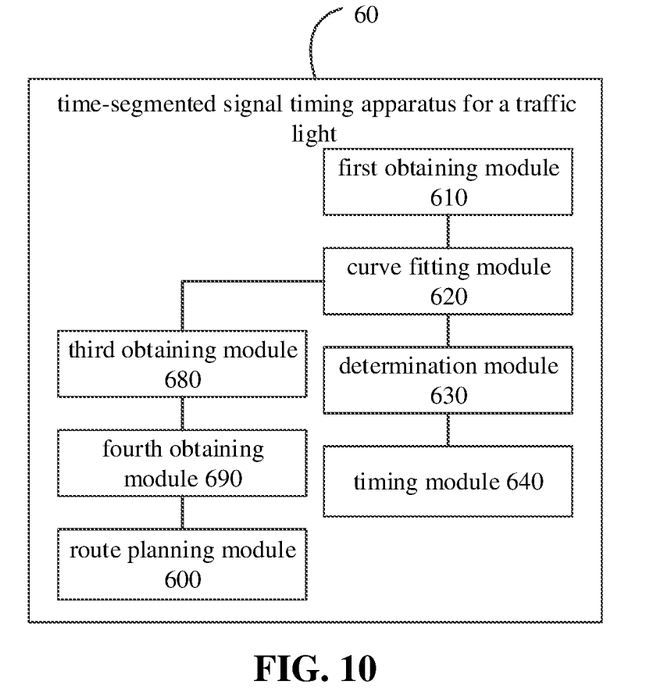
FIG. 10 is a diagram of a time-segmented signal timing apparatus for a traffic light according to a tenth embodiment of the present disclosure.

In a possible implementation of embodiments of the present disclosure, as illustrated in FIG. 10, and on the basis of the embodiment illustrated in FIG. 6, the time-segmented signal timing apparatus 60 for a traffic light further includes a third obtaining module 680, a fourth obtaining module 690, and a route planning module 600.

The third obtaining module 680 is configured to obtain a route planning request. The route planning request includes a departure time, a departure place and a destination.

The fourth obtaining module 690 is configured to obtain a traffic volume curve corresponding to each intersection on each candidate road between the departure place and the destination.

The route planning module 600 is configured to determine a congestion probability of each candidate road based on the traffic volume curve corresponding to each intersection and the departure time, and to generate a planned route based on the congestion probability of each candidate road.

By obtaining the congestion probability of each candidate road and generating the planned route based on the congestion probability, it is helpful to recommend a route with little traffic to the user and to improve the user experience.

It should be noted that the foregoing explanation of the embodiments of the time-segmented signal timing method for a traffic light is also applicable to the time-segmented signal timing apparatus for a traffic light according to embodiments of the present disclosure. As the implementation principle of the apparatus is similar to that of the method, no repeated description will be made here.

With the time-segmented signal timing apparatus for a traffic light according to embodiments of the present disclosure, the traffic volume data of the target intersection in each period of time of N consecutive days is obtained, in which N is an integer greater than 1. The curve fitting is performed on the traffic volume data to determine the traffic volume curve corresponding to the target intersection of each day. The target points in the traffic volume curve with the second derivatives satisfying the preset condition are determined. The time-segmented signal timing is performed on the traffic light at the target intersection based on the time points corresponding to the target points. Therefore, by simulating the traffic volume at the target intersection through the curve fitting to perform the time-segmented control on the traffic light, labor costs are reduced as human participation is unnecessary. Since the human participation is unnecessary, the interference of subjective feelings of humans on division results is avoided, which may improve the accuracy of the division results, improve the accuracy and reliability of the time-segmented control of the traffic light, and make intelligent transportation possible.

According to embodiments of the present disclosure, the present disclosure further provides an electronic device and a readable storage medium.

Figure 11:
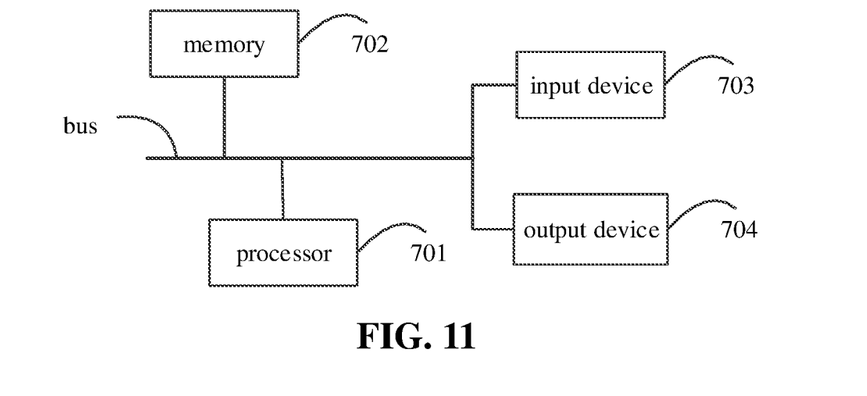
FIG. 11 is a schematic diagram of an electronic device configured to implement a time-segmented signal timing method for a traffic light according embodiments of the present disclosure.

FIG. 11 is a block diagram of an electronic device configured to implement a time-segmented signal timing method for a traffic light according embodiments of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 11, the electronic device includes: one or more processors 701, a memory 702, and interfaces for connecting various components, including a high-speed interface and a low-speed interface. The components are interconnected by different buses and may be mounted on a common motherboard or otherwise installed as required. The processor 701 may process instructions executed within the electronic device, including instructions stored in or on the memory 702 to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 701 is taken as an example in FIG. 11.

The memory 702 is a non-transitory computer-readable storage medium provided by the present disclosure. The memory 702 stores instructions executable by at least one processor, so that the at least one processor 701 executes the time-segmented signal timing method for a traffic light provided by the present disclosure. The non-transitory computer-readable storage medium according to the present disclosure stores computer instructions, which are configured to enable the computer execute the time-segmented signal timing method for a traffic light provided by the present disclosure.

As a non-transitory computer-readable storage medium, the memory 702 may be configured to store non-transitory software programs, non-transitory computer executable programs and modules, such as program instructions/modules (for example, the first obtaining module 610, the curve fitting module 620, the determination module 630, and the timing module 640 shown in FIG. 6) corresponding to the time-segmented signal timing method for a traffic light according to the embodiment of the present disclosure. The processor 701 executes various functional applications and performs data processing of the server by running non-transitory software programs, instructions and modules stored in the memory 702, that is, the time-segmented signal timing method for a traffic light according to the foregoing method embodiments is implemented.

The memory 702 may include a storage program area and a storage data area, where the storage program area may store an operating system and applications required for at least one function; and the storage data area may store data created according to the use of the electronic device that implements the time-segmented signal timing method for a traffic light, and the like. In addition, the memory 702 may include a high-speed random access memory, and may further include a non-transitory memory, such as at least one magnetic disk memory, a flash memory device, or other non-transitory solid-state memories. In some embodiments, the memory 702 may optionally include memories remotely disposed with respect to the processor 701, and these remote memories may be connected to the electronic device, which is configured to implement the time-segmented signal timing method for a traffic light, through a network. Examples of the network include, but are not limited to, the Internet, an intranet, a local area network, a mobile communication network, and combinations thereof.

The electronic device configured to implement the time-segmented signal timing method for a traffic light may further include an input device 703 and an output device 704. The processor 701, the memory 702, the input device 703 and the output device 704 may be connected through a bus or in other manners. FIG. 11 is illustrated by establishing the connection through a bus.

The input device 703 may receive input numeric or character information, and generate key signal inputs related to user settings and function control of the electronic device configured to implement the time-segmented signal timing method for a traffic light according to the embodiments of the present disclosure, such as a touch screen, a keypad, a mouse, a trackpad, a touchpad, a pointing stick, one or more mouse buttons, trackballs, joysticks and other input devices. The output device 704 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A time-segmented signal timing method for a traffic light, comprising:
    obtaining traffic volume data of a target intersection in each period of time of N consecutive days, N being an integer greater than 1;
    performing curve fitting on the traffic volume data to determine a traffic volume curve corresponding to the target intersection of each day;
    determining target points in the traffic volume curve with second derivatives satisfying a preset condition; and
    performing time-segmented signal timing on a traffic light at the target intersection based on time points corresponding to the target points;
    wherein performing the time-segmented signal timing on the traffic light at the target intersection based on the time points corresponding to the target points comprises:
    in response to a number of the target points being greater than a first threshold, determining a first derivative value corresponding to the traffic volume curve at each target point;
    extracting target points of a number equal to the first threshold from the target points based on the first derivative value corresponding to each target point; and
    performing the time-segmented signal timing on the traffic light at the target intersection based on time points corresponding to the target points extracted.

2. The time-segmented signal timing method of claim 1, wherein performing the time-segmented signal timing on the traffic light at the target intersection based on the time points corresponding to the target points comprises:
    in response to a number of the target points being greater than a first threshold, determining a time difference between time points corresponding to every two adjacent target points;
    merging two adjacent target points with a time difference less than a second threshold; and
    performing the time-segmented signal timing on the traffic light at the target intersection based on time points corresponding to the merged target points.

3. The time-segmented signal timing method of claim 1, after determining the traffic volume curve corresponding to the target intersection of each day, further comprising:
    obtaining an actual traffic volume value of the target intersection in a current period of time;
    detecting whether the actual traffic volume value matches a predicted traffic volume value in the current period of time in the traffic volume curve; and
    in response to a difference between the actual traffic volume value and the predicted traffic volume value being greater than a third threshold, performing an early warning processing at the target intersection.

4. The time-segmented signal timing method of claim 1, after determining the traffic volume curve corresponding to the target intersection of each day, further comprising:
    obtaining a route planning request, the route planning request comprising a departure time, a departure place and a destination;

obtaining a traffic volume curve corresponding to each intersection on each candidate road between the departure place and the destination;

determining a congestion probability of each candidate road based on the traffic volume curve corresponding to each intersection and the departure time; and generating a planned route based on the congestion probability of each candidate road.

5. The time-segmented signal timing method of claim 1, after determining the traffic volume curve corresponding to the target intersection of each day, further comprising:

obtaining a route planning request, the route planning request comprising a departure time, a departure place and a destination;

obtaining a traffic volume curve corresponding to each intersection on each candidate road between the departure place and the destination;

determining a congestion probability of each candidate road based on the traffic volume curve corresponding to each intersection and the departure time; and generating a planned route based on the congestion probability of each candidate road.

6. The time-segmented signal timing method of claim 2, after determining the traffic volume curve corresponding to the target intersection of each day, further comprising:

obtaining a route planning request, the route planning request comprising a departure time, a departure place and a destination;

obtaining a traffic volume curve corresponding to each intersection on each candidate road between the departure place and the destination;

determining a congestion probability of each candidate road based on the traffic volume curve corresponding to each intersection and the departure time; and generating a planned route based on the congestion probability of each candidate road.

7. The time-segmented signal timing method of claim 1, wherein performing the curve fitting on the traffic volume data to determine the traffic volume curve corresponding to the target intersection of each day comprises:

dividing the traffic volume data in each period of time of the N consecutive days into M datasets based on a preset rule, data in each dataset corresponding to the same period of time, and M being an integer greater than 1;

performing curve fitting on the data in each dataset to determine a curve corresponding to each dataset; and splicing M curves based on the period of time corresponding to the data in each dataset to generate the traffic volume curve corresponding to the target intersection of each day.

8. An electronic device, comprising:
at least one processor; and
a memory device communicatively connected to the at least one processor, wherein,
the memory device stores an instruction executable by the at least one processor, and the instruction is executed by the at least one processor to enable the at least one processor to perform a time-segmented signal timing method for a traffic light, the method comprising:

obtaining traffic volume data of a target intersection in each period of time of N consecutive days, N being an integer greater than 1;

performing curve fitting on the traffic volume data to determine a traffic volume curve corresponding to the target intersection of each day;

determining target points in the traffic volume curve with second derivatives satisfying a preset condition; and performing time-segmented signal timing on a traffic light at the target intersection based on time points corresponding to the target points;

wherein performing the time-segmented signal timing on the traffic light at the target intersection based on the time points corresponding to the target points comprises:

in response to a number of the target points being greater than a first threshold, determining a first derivative value corresponding to the traffic volume curve at each target point;

extracting target points of a number equal to the first threshold from the target points based on the first derivative value corresponding to each target point; and performing the time-segmented signal timing on the traffic light at the target intersection based on time points corresponding to the target points extracted.

9. The electronic device of claim 8, wherein performing the time-segmented signal timing on the traffic light at the target intersection based on the time points corresponding to the target points comprises:

in response to a number of the target points being greater than a first threshold, determining a time difference between time points corresponding to every two adjacent target points;

merging two adjacent target points with a time difference less than a second threshold; and performing the time-segmented signal timing on the traffic light at the target intersection based on time points corresponding to the merged target points.

10. The electronic device of claim 8, after determining the traffic volume curve corresponding to the target intersection of each day, the method further comprising:

obtaining an actual traffic volume value of the target intersection in a current period of time;

detecting whether the actual traffic volume value matches a predicted traffic volume value in the current period of time in the traffic volume curve; and in response to a difference between the actual traffic volume value and the predicted traffic volume value being greater than a third threshold, performing an early warning processing at the target intersection.

11. The electronic device of claim 8, after determining the traffic volume curve corresponding to the target intersection of each day, the method further comprising:

obtaining a route planning request, the route planning request comprising a departure time, a departure place and a destination;

obtaining a traffic volume curve corresponding to each intersection on each candidate road between the departure place and the destination;

determining a congestion probability of each candidate road based on the traffic volume curve corresponding to each intersection and the departure time; and generating a planned route based on the congestion probability of each candidate road.

12. The electronic device of claim 8, wherein performing the curve fitting on the traffic volume data to determine the traffic volume curve corresponding to the target intersection of each day comprises:

dividing the traffic volume data in each period of time of the N consecutive days into M datasets based on a preset rule, data in each dataset corresponding to the same period of time, and M being an integer greater than 1;

performing curve fitting on the data in each dataset to determine a curve corresponding to each dataset; and splicing M curves based on the period of time corresponding to the data in each dataset to generate the traffic volume curve corresponding to the target intersection of each day.

13. A non-transitory computer-readable storage medium having a computer instruction stored thereon, wherein the computer instruction is configured to enable a computer to perform a time-segmented signal timing method for a traffic light, the method comprising:

obtaining traffic volume data of a target intersection in each period of time of N consecutive days, N being an integer greater than 1;

performing curve fitting on the traffic volume data to determine a traffic volume curve corresponding to the target intersection of each day;

determining target points in the traffic volume curve with second derivatives satisfying a preset condition; and performing time-segmented signal timing on a traffic light at the target intersection based on time points corresponding to the target points;

wherein performing the time-segmented signal timing on the traffic light at the target intersection based on the time points corresponding to the target points comprises:

in response to a number of the target points being greater than a first threshold, determining a first derivative value corresponding to the traffic volume curve at each target point;

extracting target points of a number equal to the first threshold from the target points based on the first derivative value corresponding to each target point; and performing the time-segmented signal timing on the traffic light at the target intersection based on time points corresponding to the target points extracted.

14. The non-transitory computer-readable storage medium of claim 13, wherein performing the time-segmented signal timing on the traffic light at the target intersection based on the time points corresponding to the target points comprises:

in response to a number of the target points being greater than a first threshold, determining a time difference between time points corresponding to every two adjacent target points;

merging two adjacent target points with a time difference less than a second threshold; and performing the time-segmented signal timing on the traffic light at the target intersection based on time points corresponding to the merged target points.

15. The non-transitory computer-readable storage medium of claim 13, after determining the traffic volume curve corresponding to the target intersection of each day, the method further comprising:

obtaining an actual traffic volume value of the target intersection in a current period of time;

detecting whether the actual traffic volume value matches a predicted traffic volume value in the current period of time in the traffic volume curve; and in response to a difference between the actual traffic volume value and the predicted traffic volume value being greater than a third threshold, performing an early warning processing at the target intersection.

16. The non-transitory computer-readable storage medium of claim 13, after determining the traffic volume curve corresponding to the target intersection of each day, the method further comprising:

obtaining a route planning request, the route planning request comprising a departure time, a departure place and a destination;

obtaining a traffic volume curve corresponding to each intersection on each candidate road between the departure place and the destination;

determining a congestion probability of each candidate road based on the traffic volume curve corresponding to each intersection and the departure time; and generating a planned route based on the congestion probability of each candidate road.

17. The non-transitory computer-readable storage medium of claim 13, wherein performing the curve fitting on the traffic volume data to determine the traffic volume curve corresponding to the target intersection of each day comprises:

dividing the traffic volume data in each period of time of the N consecutive days into M datasets based on a preset rule, data in each dataset corresponding to the same period of time, and M being an integer greater than 1;

performing curve fitting on the data in each dataset to determine a curve corresponding to each dataset; and splicing M curves based on the period of time corresponding to the data in each dataset to generate the traffic volume curve corresponding to the target intersection of each day.

* * * * *